(12) United States Patent
Hart

(10) Patent No.: US 8,257,477 B1
(45) Date of Patent: Sep. 4, 2012

(54) DUST CONTROL SYSTEM

(76) Inventor: Scott A. Hart, Wright, WY (US)

( * ) Notice: Subject to any disclaimer, the term of this patent is extended or adjusted under 35 U.S.C. 154(b) by 95 days.

(21) Appl. No.: 12/555,527

(22) Filed: Sep. 8, 2009

(51) Int. Cl.
*B01D 47/00* (2006.01)

(52) U.S. Cl. ............... 96/270; 96/271; 96/322; 141/91

(58) Field of Classification Search ............... 55/385.1, 55/385.2, 385.4, 385.5, 233, 257, 468; 96/270, 96/271, 273, 322, 324, 326, 328; 261/76, 261/94, 98, 115, 116; 299/12, 43, 64; 252/88.1; 404/76; 15/300.1
See application file for complete search history.

(56) References Cited

U.S. PATENT DOCUMENTS

| | | | |
|---|---|---|---|
| 690,372 A | | 12/1901 | Lloyd |
| 2,293,250 A | * | 8/1942 | Fisher ..................... 451/456 |
| 3,336,733 A | * | 8/1967 | Wisting ..................... 96/235 |
| 3,387,889 A | | 6/1968 | Ziemba et al. |
| 3,443,364 A | | 5/1969 | Saltsman |
| 3,646,728 A | | 3/1972 | Holler, Jr. |
| 3,767,536 A | | 10/1973 | Ikeda et al. |
| 3,880,624 A | * | 4/1975 | Arnold et al. .................... 96/228 |
| 3,939,881 A | * | 2/1976 | Scott ..................... 141/91 |
| 4,067,703 A | * | 1/1978 | Dullien et al. .................. 95/218 |
| 4,249,778 A | | 2/1981 | McGuire |
| 4,380,353 A | | 4/1983 | Campbell et al. |
| 4,439,211 A | * | 3/1984 | Anderson et al. ............. 134/25.1 |
| 4,531,784 A | * | 7/1985 | Karlovsky ..................... 299/64 |
| 4,718,924 A | * | 1/1988 | DeMarco ..................... 55/302 |
| 4,946,482 A | | 8/1990 | Tamba et al. |
| 5,001,807 A | | 3/1991 | Arai |
| 5,518,299 A | * | 5/1996 | Adamczyk et al. ............. 299/12 |
| 5,803,955 A | * | 9/1998 | Raring ..................... 96/239 |
| 6,132,497 A | * | 10/2000 | Conklin ..................... 96/239 |
| 6,241,809 B1 | * | 6/2001 | Hopkins ..................... 95/216 |
| 7,175,364 B2 | * | 2/2007 | Gaertner et al. ............. 404/76 |

OTHER PUBLICATIONS

Citing the Abstract of the following article:Tsair-Wang Chung, Tushar K. Ghosh, Anthony L. Hines, and Davor Novosel; "Dehumidification of Moist Air With Simultaneous Removal of Selected Indoor Pollutants by Triethylene Glycol Solutions in a Packed-Bed Absorber," Separation Science and Technology, vol. 30, pp. 1807-1832 (1995).*
Citing the definition of "vehicle" as found in Merriam-Webster Dictionary online. www.merriam-webster.com/dictionary/vehicle (Sep. 29, 2011).*

* cited by examiner

*Primary Examiner* — Duane Smith
*Assistant Examiner* — Pankti Patel
(74) *Attorney, Agent, or Firm* — Neustel Law Offices

(57) ABSTRACT

A dust control system for efficiently collecting dust laden air within and around a mining area. The dust control system generally includes a support structure, a duct assembly supported by the support structure, wherein the duct assembly includes an inlet for receiving dust laden air, an outlet for discharging a dust slurry, and a passageway connecting the inlet with the outlet and an injection pipe assembly directed within the passageway for injecting a mixture of a compressed air and a liquid within the passageway to mix with the dust laden air. The outlet of the injection pipe assembly is positioned forward the inlet of the duct assembly relative travel of the dust laden air through the passageway for generating a suction to force the dust laden air within the inlet.

20 Claims, 6 Drawing Sheets

DUST CONTROL SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a mining assembly and more specifically it relates to a dust control system for efficiently collecting dust laden air within and around a mining area.

2. Description of the Related Art

Any discussion of the related art throughout the specification should in no way be considered as an admission that such related art is widely known or forms part of common general knowledge in the field.

Loading and unloading areas, such as those in and around mining areas, have constantly been a source of mass amounts of pollutant or dust laden air due to the properties of the mined material. The dust laden air can often times be harmful to the environment including surrounding plants, animals, and individuals operating the machinery that loads and unloads the dust prevalent material. Because of the inherent problems with the related art, there is a need for a new and improved dust control system for efficiently collecting dust laden air within and around a mining area.

BRIEF SUMMARY OF THE INVENTION

A system for efficiently collecting dust laden air within and around a mining area. The invention generally relates to a dust collector which includes a support structure, a duct assembly supported by the support structure, wherein the duct assembly includes an inlet for receiving dust laden air, an outlet for discharging a dust slurry, and a passageway connecting the inlet with the outlet and an injection pipe assembly directed within the passageway for injecting a mixture of a compressed air and a liquid within the passageway to mix with the dust laden air. The outlet of the injection pipe assembly is positioned forward the inlet of the duct assembly relative travel of the dust laden air through the passageway for generating a suction to force the dust laden air within the inlet.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
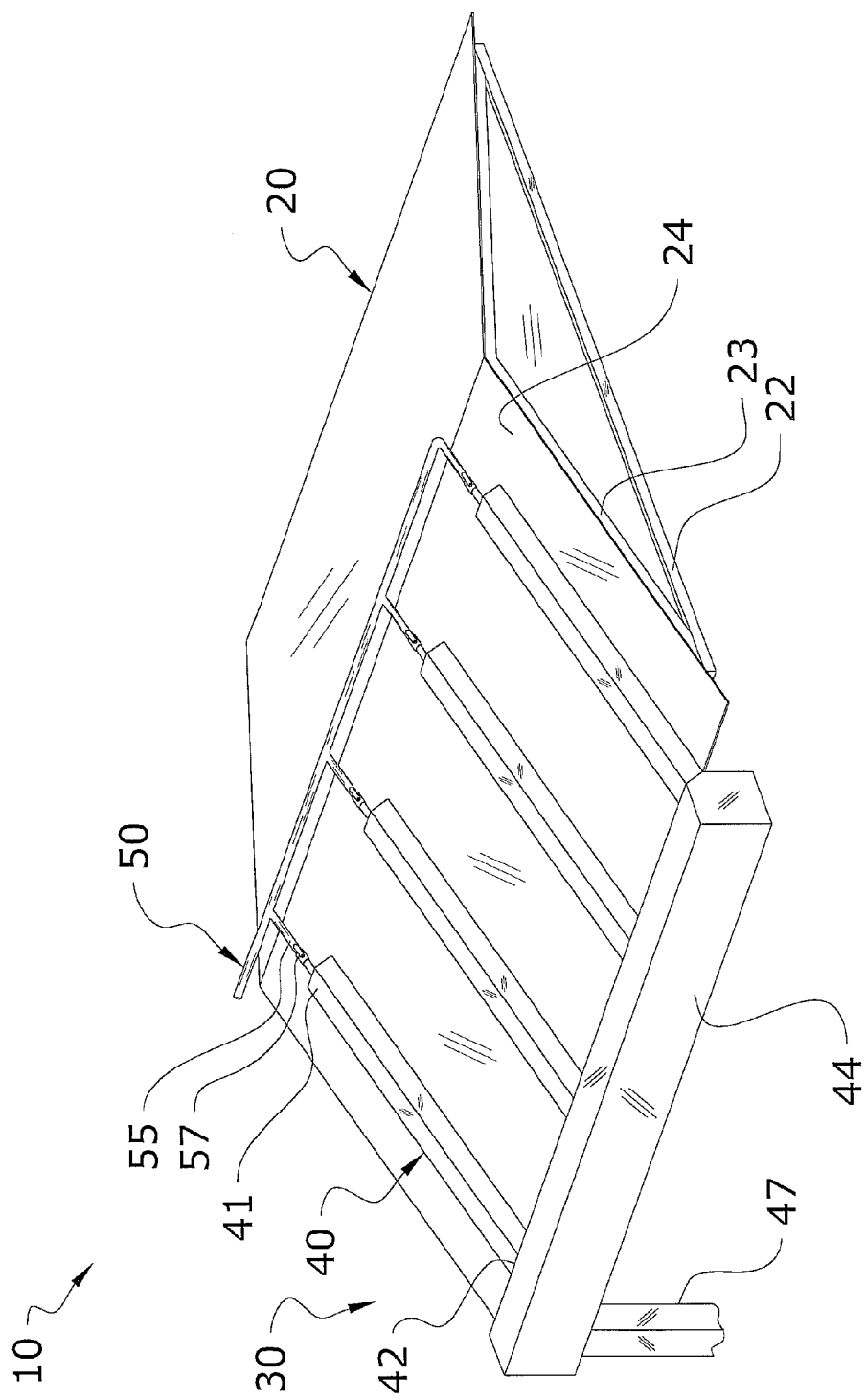
FIG. 1 is an upper perspective view of the present invention.
Figure 2:
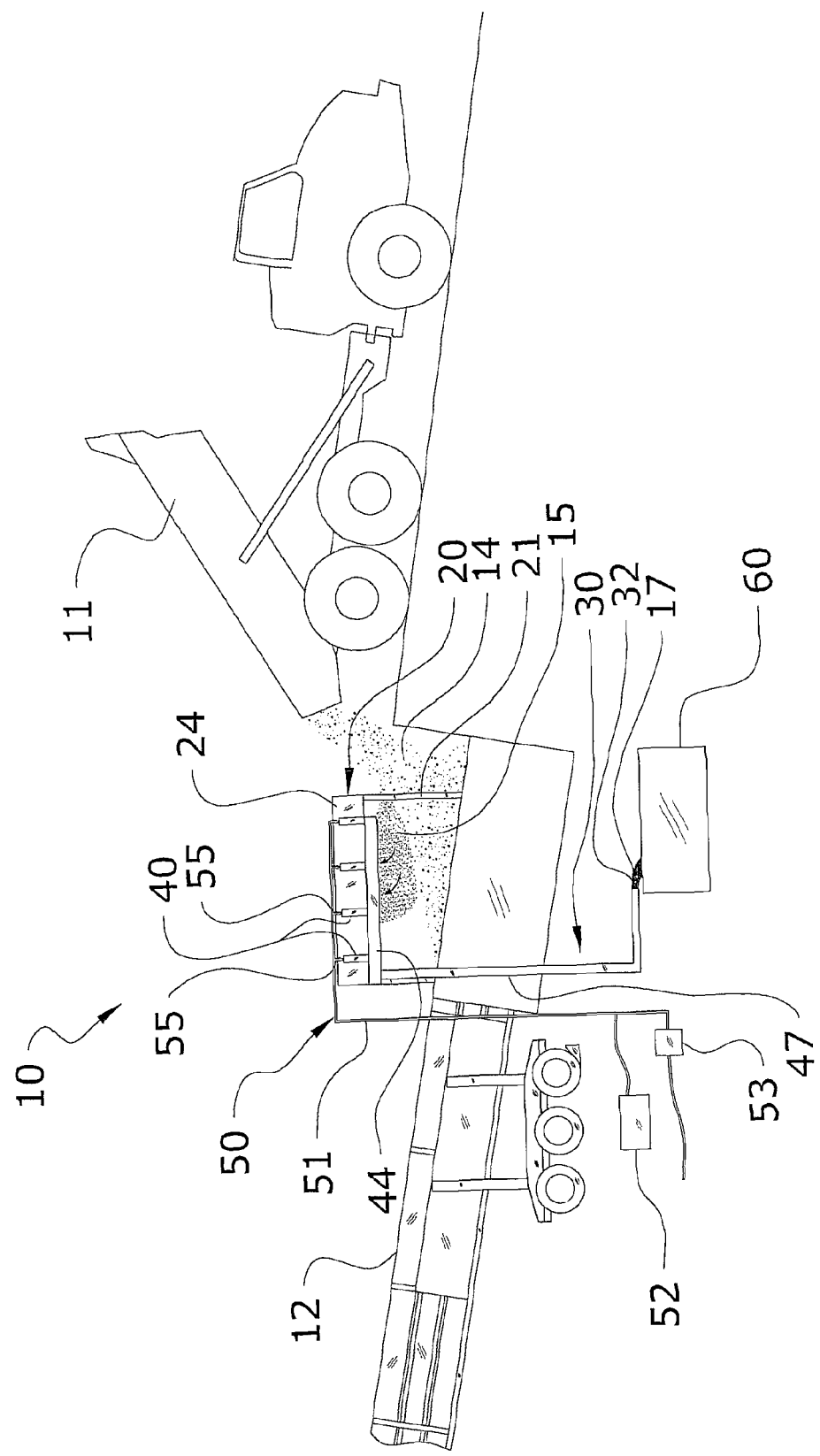
FIG. 2 is a side view of the present invention in use within a loading and unloading area.
Figure 3:
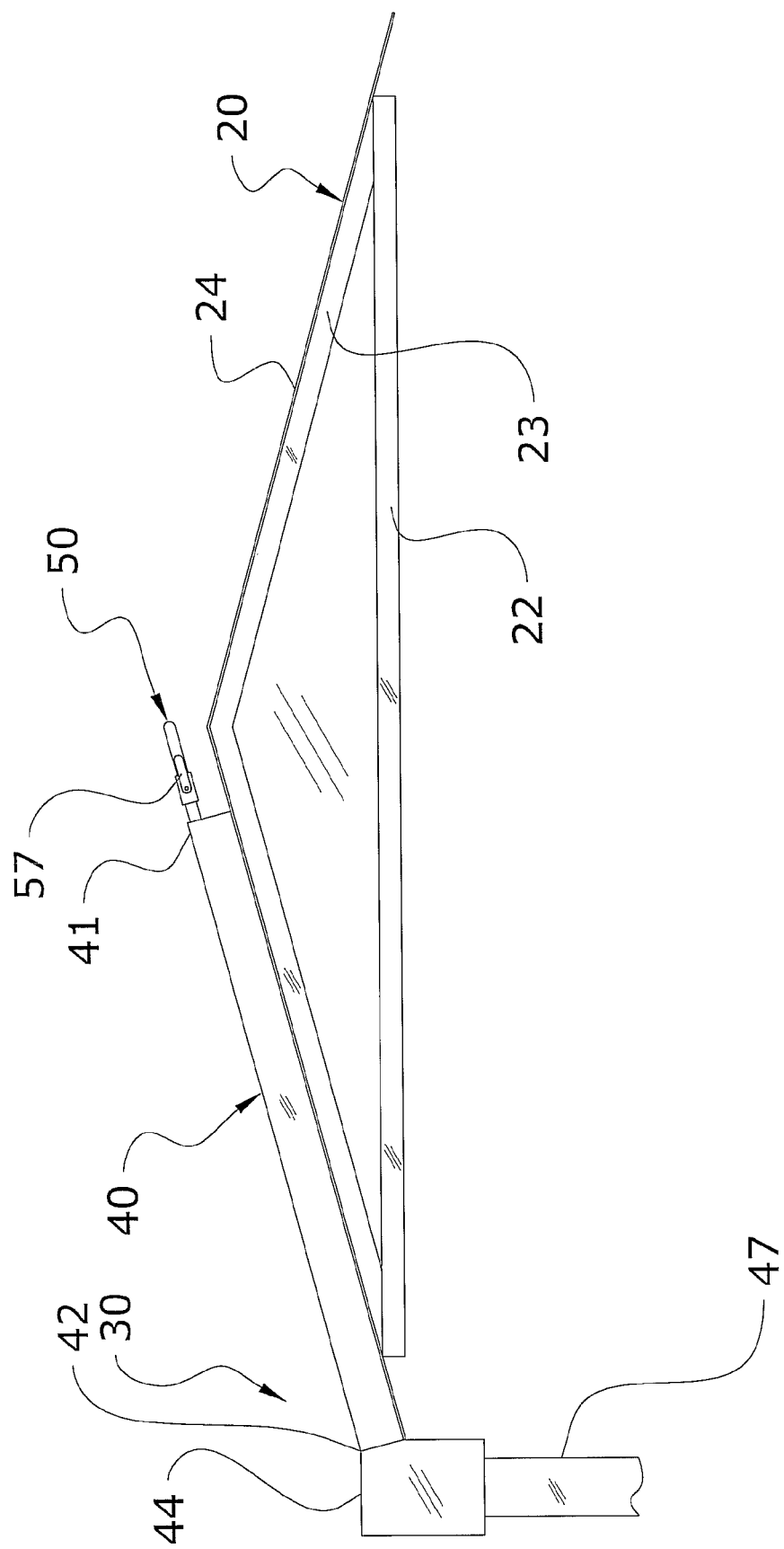
FIG. 3 is a front view of the present invention.
Figure 4:
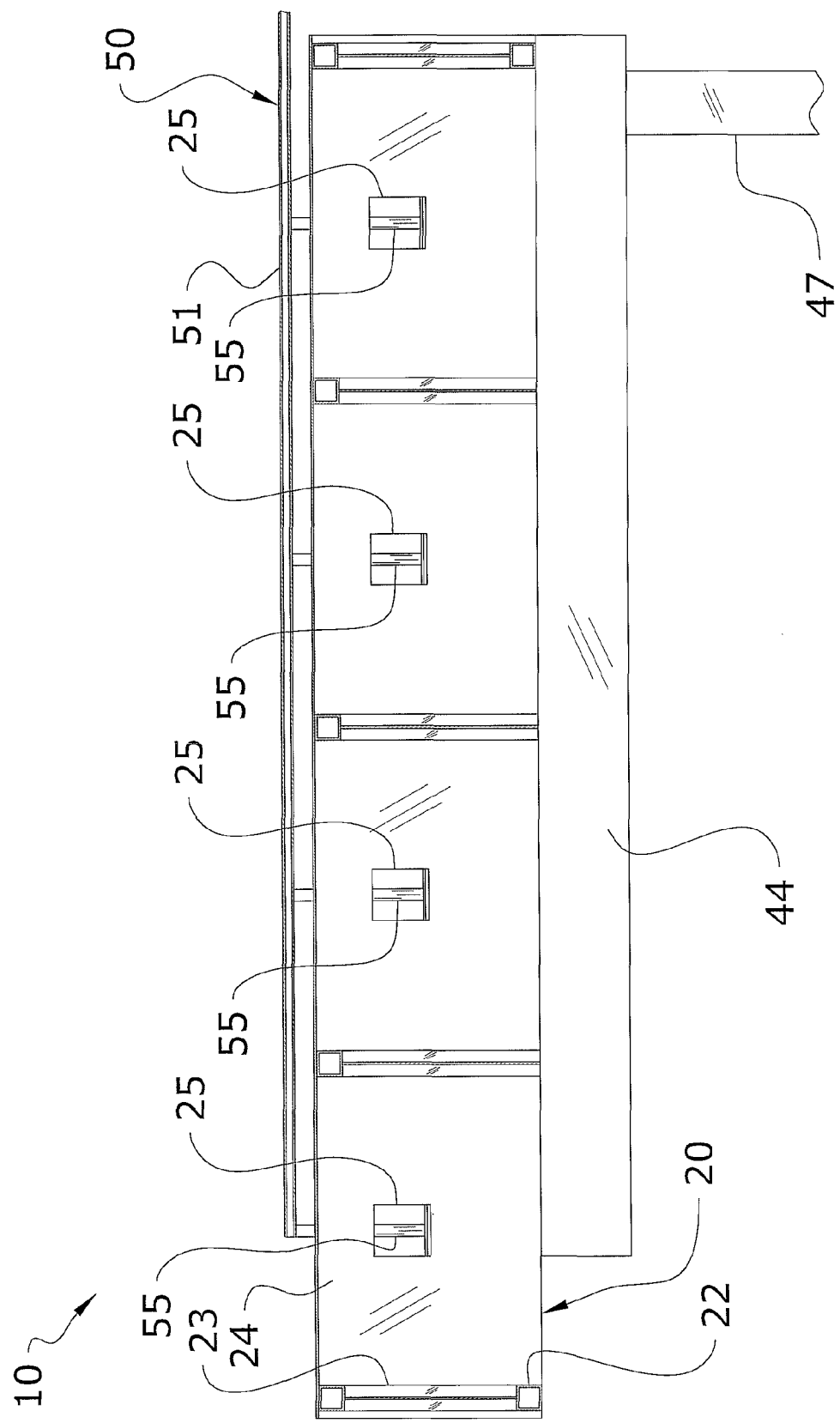
FIG. 4 is a side sectional view of the present invention with the sectional cut taken along the peak of the roof.
Figure 5:
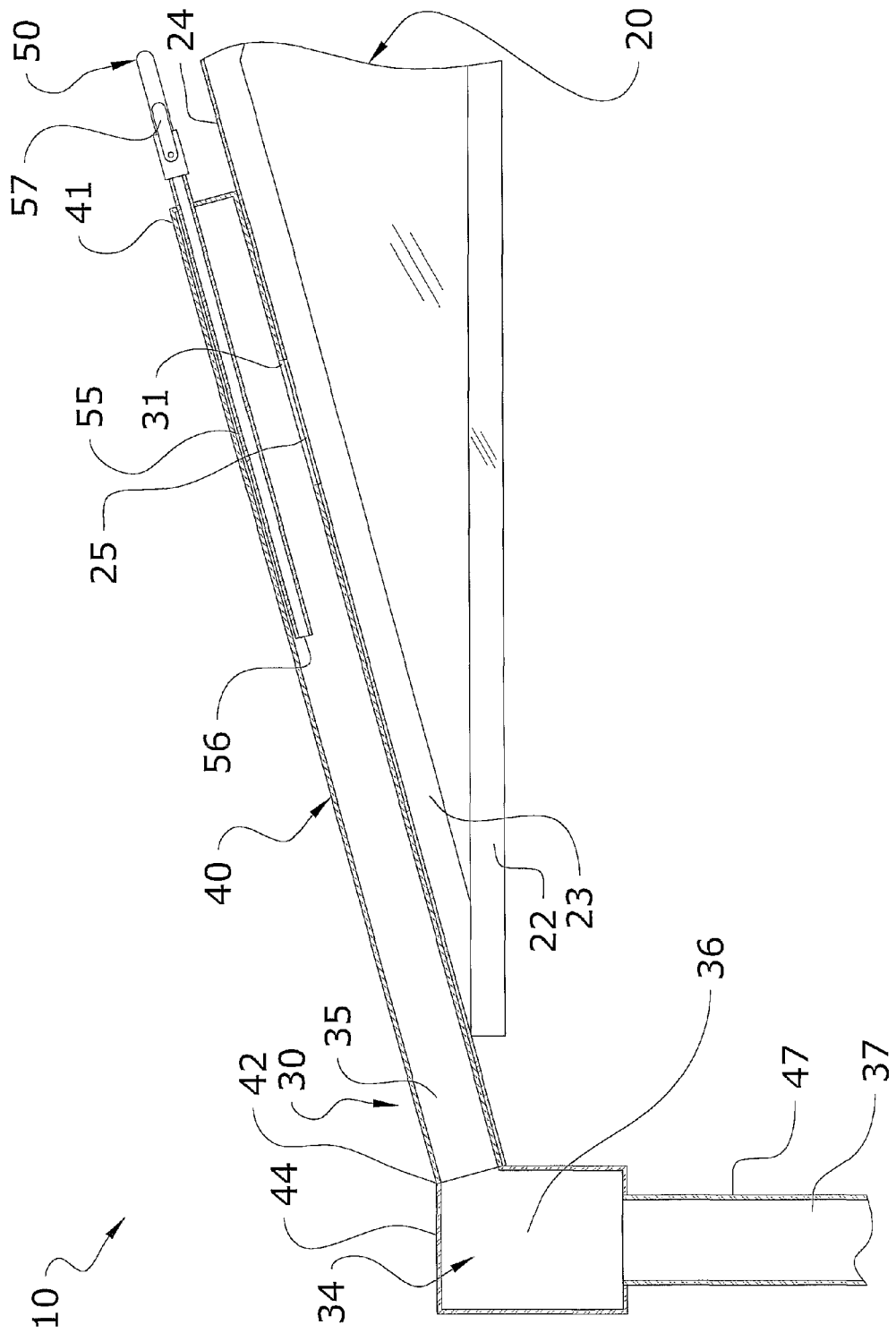
FIG. 5 is a front sectional view of the present invention.
Figure 6:
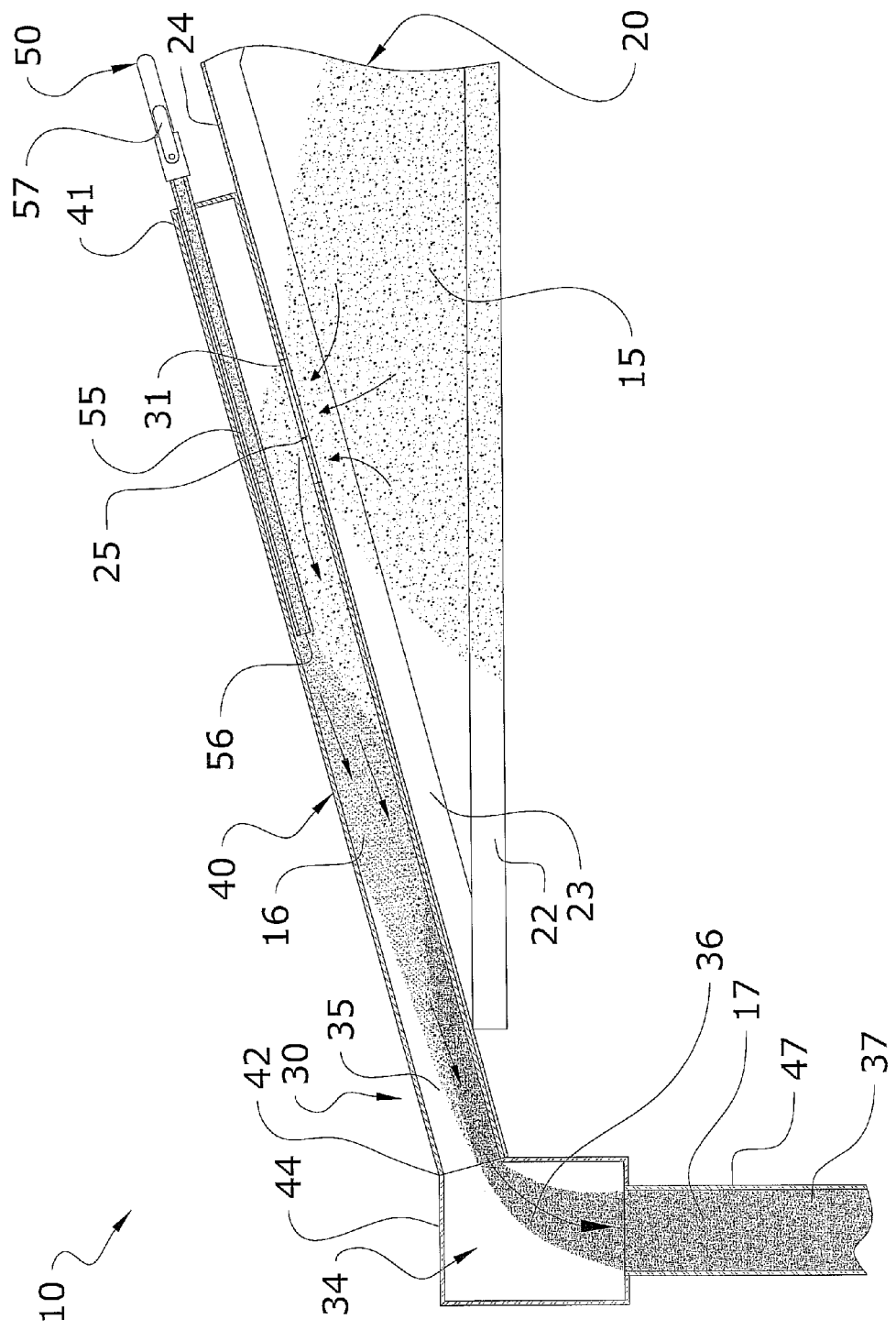
FIG. 6 is a front sectional view of the present invention in use.

Turning now descriptively to the drawings, in which similar reference characters denote similar elements throughout the several views, FIGS. 1 through 6 illustrate a dust control system 10, which comprises a support structure 20, a duct assembly 30 supported by the support structure 20, wherein the duct assembly 30 includes an inlet 31 for receiving dust laden air 15, an outlet 32 for discharging a dust slurry 17, and a passageway 34 connecting the inlet 31 with the outlet 32 and an injection pipe assembly 50 directed within the passageway 34 for injecting a mixture 16 of a compressed air and a liquid within the passageway 34 to mix with the dust laden air 15. The outlet 56 of the injection pipe assembly 50 is positioned forward the inlet 31 of the duct assembly 30 relative travel of the dust laden air 15 through the passageway 34 for generating a suction to force the dust laden air 15 within the inlet 31 and passageway 34.

B. Unloading and Loading Area

The dust control system 10 is preferably used in and around an unloading and loading area to remove the dust laden air 15 from the surrounding atmosphere. The unloading and loading area preferably extends to various types of unloading and loading industries that unloads and loads various types of materials 14. Such industries may unload and load materials 14 such as coal, gravel, rocks, or various other materials.

The material 14 may be unloaded and loaded through the use of various types of unloading 11, such as dump trucks, train cars, conveyors, pay loaders, etc., and loaded through various types of loading vehicles 12, such as dump trucks, train cars, pay loaders, conveyors, etc. It is appreciated that various other types of loading and unloading vehicles 11, 12 or machinery may be used. The unloading and loading areas may further extend to crushing areas, such as for crushing mined rock, coal, etc., transfer points for the material 14, storage points for the material 14, along different portions of the conveyor, such as the head pulley, tail pulley, feeders, etc., or various other locations where dust is prevalent. The dust of the dust laden air 15 may refer to any type of dust, pollutant, or contaminate present within the air that is desired to be removed.

C. Support Structure

The support structure 20 is generally positioned nearby the unloading and loading area and preferably within the unloading and loading area or other area in which dust laden air 15 is prevalent and needed to be collected to be removed from the atmosphere. The support structure 20 is preferably comprised of a canopy or roof-style structure to extend overhead at least a portion of the loading and unloading area to more efficiently collect the dust laden air 15 as the air naturally rises or circulates. In the preferred embodiment, the support structure 20 extends over the loading portion of the loading vehicle 12 (e.g. conveyor).

In the preferred embodiment, the support structure 20 is supported overhead via a plurality of vertical columns 21. A plurality of joists 22 and rafters 23 are formed and connected to the columns 21 to support the roof 24 in which the duct assembly 30 is supported thereon. The height of the roof 24, joists 22, and rafters 23 is preferably great enough to allow for the material 14 (e.g. coal, gravel, rocks, etc.) to be unloaded, loaded, or worked upon underneath thereof.

The roof 24 also preferably includes a plurality of openings 25 extending therethrough to align with the inlets 31 of the duct assembly 30, wherein the duct assembly 30 is preferably secured atop the roof 24 so as to be efficiently supported and protected from engagement of the material 14 or vehicles 11, 12. The plurality of openings 25 are preferably equidistantly spaced along a length of the roof 24 that is parallel to the direction of travel of the material 14 from the unloading vehicle 11 to the loading vehicle 12, or the direction that best surrounds the area that the dust laden air 15 is most prevalent.

The support structure 20 also serves as an exhaust hood to better direct the dust laden air 15 within the openings 25. It is appreciated that each opening 25 may include a separate exhaust hood, or a single exhaust hood may extend around all of the openings 25. It is appreciated that in various alternate embodiments, the support structure 20 may be integral with various loading or unloading vehicles 11, 12, as well as integral with a mine, or various other configurations.

D. Duct Assembly

The duct assembly 30 is used to receive the dust laden air 15, provide a mixing area for the dust laden air 15 to be mixed with the mixture 16 of air and liquid and to channel the formed slurry 17 to the collection point where the slurry 17 may be disposed of, collected such as with the vehicles 11, 12, or recycled. The duct assembly 30 includes an inlet 31 that aligns with the opening 25 of the roof 24 of the support structure 20, an outlet 32 that is directed within the collection chamber 60, and a passageway 34 extending between thereof.

The duct assembly 30 is preferably filterless to prevent ongoing maintenance of the present invention, due to the need to replace and monitor filters. The duct assembly 30 and injection pipe assembly 50 may be comprised of various materials, such as but not limited to carbon steel, stainless steel, plastic or various other types.

The passageway 34 includes a first portion 35 near the inlet 31 for mixing the dust laden air 15 with the air and liquid mixture 16 to form a slurry 17, a second portion 36 laterally positioned with respect to the first portion 35 for connecting a plurality of first portions 35, and a third portion 37 extending from the second portion 36 for delivering the slurry 17 to the collection point 60. The first portion 35, the second portion 36, and the third portion 37 are each fluidly connected and travel in a generally downhill manner so that gravity controls the direction of travel of the formed slurry 17.

The duct assembly 30 is comprised of a plurality of first segments 40 to define the first portions 35, a second segment 44 combining the plurality of first segments 40 to define the second portion 36, and a third segment 47 extending from the second segment 44 to define the third portion 37. The first segments 40, the second segment 44, and the third segment 47 may be comprised of upside down U-shaped channel members to seal against the roof 24, rafters 23, or columns 21, square or tubular piping structures, or various other shaped structures all which efficiently direct the slurry 17 to the collection chamber 60 or other collection point. The number of first segments 40 and thus secondary pipes 55 is preferably determined by the size of the location that needs to be rid of dust laden air 15 and the amount of dust laden air 15 present.

In the preferred embodiment, the duct assembly 30 includes a plurality of first segments 40 equidistantly spaced apart along the roof 24 in a parallel manner. The first segments 40 travel along the slope of the roof 24 from an upper part of the roof 24 to a lower part of the roof 24. The inlet 31 extends through each of the first segments 40 preferably adjacent the upper end 41 of the first segments 40. The injection pipe assembly 50, which will be described in the subsequent section, extends within the first segment 40 past the inlet 31 towards the lower end 42 of the first segment 40.

Preferably one second segment 44 extends along each side of the roof 24 to fluidly connect the lower ends 42 of each of the first segments 40. The second segment 44 extends in a horizontal orientation and is generally perpendicular to the first segments 40. The second segment 44 travels along the lower edge of the roof 24 similar to a rain gutter traveling in a similar orientation. It is appreciated that the second segment 44 may slope slightly to increase the flow rate of the slurry 17 through the second portion 36 of the passageway 34 within the second segment 44.

Preferably at least one third segment 47 including the third portion 37 of the passageway 34 vertically extends downward from the respective second segment 44. The third segment 47 generally extends in vertical direction downward from the second segment 44 towards the collection chamber 60.

E. Injection Pipe Assembly

The injection pipe assembly 50 is used to inject a mixture 16 of compressed air and liquid within the duct assembly 30, and more specifically the first portion 35 of the passageway 34 within the first segment 40 of the duct assembly 30, to mix with the dust laden air 15 and form the slurry 17 that can be easily handled to remove the contained dust and other pollutant particles.

The injection pipe assembly 50 generally includes at least one primary pipe 51. The primary pipe 51 is fed forced air from an air compressor 52 and also fed liquid from a liquid pump 53 preferably at an end of the primary pipe 51 opposite the secondary pipes 55. The forced air and the liquid are mixed within the primary pipe 51 to be injected in a simultaneous manner within the passageway 34. The liquid may be comprised of various types of liquids, such as but not limited to water and glycol. In the preferred embodiment, water (e.g. recycled water) is used as the liquid in warm periods of the year not subject to freezing, and glycol is used as the liquid in periods of the year that are subject to freezing, wherein glycol has a much lower freezing temperature than water. Various other chemicals or liquids that are environmentally acceptable could also be used in place of the water or glycol.

The combination 16 of the liquid and forced air helps to generate a better suction than liquid alone. The liquid is necessary to form the slurry 17 from the dust laden air 15 and the forced air is necessary to generate a useful and powerful suction to bring the dust laden air 15 into the passageway 34 to contact the mixture 16.

Fluidly connected to the primary pipe 51 are a plurality of secondary pipes 55. The secondary pipes 55 are preferably fluidly connected in a parallel manner and travel along the roof 24 in a declined orientation to within the first segments 40 of the duct assembly 30 from an upper end 41 of the first segments 40. Each secondary pipe 55 preferably aligns with and is directed within a respective first segment 40. Each secondary pipe 55 may also include a valve 57 for individually turning the mixture 16 flow through the respective secondary pipe 55 on and off.

The secondary pipes 55 extend within the first segments 40 preferably beyond the inlet 31 of the duct assembly 30 so that the outlet 56 of the secondary pipe 55 is positioned forwardly of the inlet 31 of the duct assembly 30 with respect to the direction of travel of the first segment 40 from an upper end 41 to a lower end 42. As the high pressured mixture 16 travels out of the outlet 56 of the secondary pipe 55, the mixture 16 generates a suction within the first portion 35 of the passageway 34 that works to force the dust laden air 15 within the inlet 31 of the first segment 40 and towards the outlet 56 of the secondary pipes 55 to mix with the mixture 16 and form the slurry 17.

F. Collection Chamber

The collection chamber 60 is positioned in fluid communication with the outlet 32 of the duct assembly 30. The collection chamber 60 may be comprised of various configurations, such as a bin or other configurations. The collection chamber 60 may be manually emptied or automatically empty to the loading vehicle 12 or various other mechanisms. The slurry 17 may be allowed to dry within the collection chamber 60, thus forming a solid which would then be easily transferred to a recycling or disposal center.

G. Operation of Preferred Embodiment

In use, as the unloading vehicle 11 unloads the material 14 to the loading vehicle 12, the material 14 releases mass amounts of dust that mix with the surrounding air. The air compressor 52 and liquid pump 53 force the mixture 16 of air and liquid through the injection pipe assembly 50 to within the first portion 35 of the passageway 34 to generate a suctioning force.

The mixture 16 creates a mist once entering the first portion 35 and contacting the interior walls of the first segment 40 to efficiently contact all of the dust laden air 15 within to generate the slurry 17. The suction and natural rising of the air causes the dust laden air 15 to be directed through the opening 25 of the roof 24, and within the inlet 31 of the duct assembly 30 to enter the passageway 34.

The dust laden air 15 travels in a downward and forward direction once within the passageway 34 via forces of gravity and the suction generated by the injection assembly. Once the dust laden air 15 moves past the outlet 56 or nozzle of the respective secondary pipe 55, the dust laden air 15 mixes with the mixture 16 of compressed air and liquid to form the slurry 17 which is a partially solid mixture 16 of air, liquid, and dust. The slurry 17 then continues to travel through the first portion 35 of the passageway 34, to within the second portion 36, to within the third portion 37 out the outlet 32 and within the collection chamber 60.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A dust control system for a loading and unloading area, comprising:

a support structure, wherein said support structure includes an inclined roof, wherein said support structure includes a plurality of vertical columns, wherein said support structure is positioned overhead said loading and unloading area;

a duct assembly supported by said support structure, wherein said duct assembly is positioned on to of said support structure;

wherein said duct assembly includes an inlet for receiving dust laden air, an outlet for discharging a dust slurry, and a passageway connecting said inlet with said outlet;

wherein said inlet is positioned overhead said loading and unloading area; and an injection pipe assembly directed within said passageway for injecting a mixture of a air and a liquid within said passageway to mix with said dust laden air;

wherein an outlet of said injection pipe assembly is positioned forward said inlet of said duct assembly relative travel of said dust laden air through said passageway for generating a suction to force said dust laden air within said inlet.

2. The dust control system of claim 1, wherein said duct assembly is comprised of a filterless structure.

3. The dust control system of claim 1, wherein at least a portion of said passageway extends along said inclined roof.

4. The dust control system of claim 3, wherein said inlet is positioned adjacent an upper end of said duct assembly.

5. The dust control system of claim 4, wherein said inclined roof includes an opening, wherein said opening aligns with said inlet.

6. The dust control system of claim 1, wherein said duct assembly includes a plurality of first segments, a second segment fluidly connecting said plurality of first segments and a third segment fluidly connected to said second segment, wherein said passageway travels through said plurality of first segments, said second segment, and said third segment.

7. The dust control system of claim 6, wherein said plurality of first segments are positioned in a parallel configuration.

8. The dust control system of claim 7, wherein said plurality of first segments are inclined.

9. The dust control system of claim 1, wherein said injection pipe assembly includes a primary pipe and plurality of secondary pipes fluidly connected to said primary pipe, wherein said plurality of secondary pipes are directed within said passageway.

10. The dust control system of claim 9, wherein said plurality of secondary pipes are connected in a parallel configuration.

11. The dust control system of claim 1, wherein said injection pipe assembly includes an air compressor for providing said air and a liquid pump for providing said liquid.

12. The dust control system of claim 1, wherein said liquid is comprised of water.

13. The dust control system of claim 1, wherein said liquid is comprised of glycol.

14. A filterless dust control system for a loading and unloading area, comprising:
- a support structure including an inclined roof, wherein said support structure includes a plurality of vertical columns, wherein said support structure is positioned overhead said loading and unloading area;
- wherein said inclined roof includes an opening extending therethrough;
- a duct assembly at least partially supported by said inclined roof, wherein at least a portion of said duct assembly is positioned on top of said inclined roof;
- wherein said duct assembly is comprised of a filterless structure;
- wherein said duct assembly includes an inlet to align with said opening of said inclined roof for receiving dust laden air, an outlet for discharging a dust slurry, and a passageway connecting said inlet with said outlet;
- wherein said inlet is positioned overhead said loading and unloading area; and
- an injection pipe assembly directed within said passageway for injecting a mixture of air and a liquid within said passageway to mix with said dust laden air;
- wherein an outlet of said injection pipe assembly is positioned forward said inlet of said duct assembly relative travel of said dust laden air through said passageway for generating a suction to force said dust laden air within said inlet.

15. The dust control system of claim 14, wherein said injection pipe assembly includes an air compressor for providing said air and a liquid pump for providing said liquid.

16. The dust control system of claim 14, wherein said duct assembly includes a plurality of first segments positioned along said inclined roof, a second segment fluidly connecting said plurality of first segments and a third segment fluidly connected to said second segment, wherein said passageway travels through said plurality of first segments, said second segment, and said third segment.

17. The dust control system of claim 16, wherein said plurality of first segments are positioned in a parallel configuration.

18. The dust control system of claim 14, wherein said injection pipe assembly includes a primary pipe and plurality of secondary pipes fluidly connected to said primary pipe, wherein said plurality of secondary pipes are directed within said passageway.

19. The dust control system of claim 18, wherein said plurality of secondary pipes are connected in a parallel configuration.

20. A filterless dust control system for a loading and unloading area, comprising:
- a support structure including an inclined roof, wherein said support structure includes a plurality of vertical columns, wherein said support structure is positioned overhead said loading and unloading area;
- wherein said inclined roof includes an opening extending therethrough;
- a duct assembly at least partially supported by said inclined roof, wherein at least a portion of said duct assembly is positioned on top of said inclined roof;
- wherein said duct assembly is comprised of a filterless structure;
- wherein said duct assembly includes an inlet to align with said opening of said inclined roof for receiving dust laden air, an outlet for discharging a dust slurry, and a passageway connecting said inlet with said outlet;
- wherein said inlet is positioned overhead said loading and unloading area;
- an injection pipe assembly directed within said passageway for injecting a mixture of air and a liquid within said passageway to mix with said dust laden air;
- wherein said injection pipe assembly includes an air compressor for providing said air and a liquid pump for providing said liquid;
- wherein an outlet of said injection pipe assembly is positioned forward said inlet of said duct assembly relative travel of said dust laden air through said passageway for generating a suction to force said dust laden air within said inlet;
- wherein said duct assembly includes a plurality of first segments positioned along said inclined roof, a second segment fluidly connecting said plurality of first segments and a third segment fluidly connected to said second segment;
- wherein said passageway travels through said plurality of first segments, said second segment, and said third segment;
- wherein said plurality of first segments are positioned in a parallel configuration;
- wherein said injection pipe assembly includes a primary pipe and plurality of secondary pipes fluidly connected to said primary pipe, wherein said plurality of secondary pipes are directed within said plurality of first segments;
- wherein said plurality of secondary pipes are connected in a parallel configuration;
- wherein said plurality of secondary pipes each include a valve for individually controlling a flow rate through said plurality of secondary pipes; and
- a collection chamber fluidly connected to said outlet for receiving said dust slurry.

* * * * *